(12) United States Patent
Kumar et al.

(10) Patent No.: US 7,922,120 B2
(45) Date of Patent: Apr. 12, 2011

(54) WING ICE PROTECTION HEATER ELEMENT NETWORK

(75) Inventors: Mukesh Kumar, Torrance, CA (US); Edwin Wing-Kwong Yue, Unionville, CA (US); David Lazarovich, Thornhill, CA (US)

(73) Assignee: Honeywell International Inc., Morristown, NJ (US)

( * ) Notice: Subject to any disclaimer, the term of this patent is extended or adjusted under 35 U.S.C. 154(b) by 768 days.

(21) Appl. No.: 11/939,313

(22) Filed: Nov. 13, 2007

(65) Prior Publication Data

US 2008/0111028 A1    May 15, 2008

Related U.S. Application Data

(60) Provisional application No. 60/866,022, filed on Nov. 15, 2006.

(51) Int. Cl.
*B64D 15/14* (2006.01)
(52) U.S. Cl. .................................................... 244/134 D
(58) Field of Classification Search .. 244/134 D–134 R; 219/202, 209, 50, 458.1
See application file for complete search history.

(56) References Cited

U.S. PATENT DOCUMENTS

| | | | |
|---|---|---|---|
| 3,002,718 A * | 10/1961 | Hackenberger, Jr George I | 244/134 R |
| 3,420,476 A * | 1/1969 | Schultz Herbert et al. | 244/134 D |
| 3,453,415 A | 7/1969 | Hermes et al. | |
| 4,036,457 A | 7/1977 | Volkner et al. | |
| 4,514,619 A | 4/1985 | Kugelman | |
| 5,351,918 A * | 10/1994 | Giamati et al. | 244/134 D |
| 5,765,779 A | 6/1998 | Hancock et al. | |
| 5,947,418 A * | 9/1999 | Bessiere et al. | 244/134 D |
| 5,971,323 A * | 10/1999 | Rauch et al. | 244/134 D |
| 6,338,455 B1 * | 1/2002 | Rauch et al. | 244/134 D |
| 7,246,773 B2 * | 7/2007 | Stoner et al. | 244/134 D |
| 7,556,221 B2 * | 7/2009 | Hindel et al. | 244/134 D |
| 7,580,777 B2 * | 8/2009 | Smith et al. | 701/3 |

FOREIGN PATENT DOCUMENTS

| | | |
|---|---|---|
| WO | WO 2005/073084 A1 | 8/2005 |
| WO | WO 2006/124026 A1 | 11/2006 |

* cited by examiner

*Primary Examiner* — Tien Dinh
(74) *Attorney, Agent, or Firm* — Oral Caglar, Esq.

(57) ABSTRACT

An ice prevention network comprising a plurality of non-overlapping heater elements arranged in a grid along an airfoil is provided, powered by a multiphase power source, each phase powering selected heater elements that can selectively be powered on and powered off. The grid has a number of zones extending along the airfoil perpendicular to the airflow over the airfoil and a number of sections extending along the surface of the airfoil parallel to the airflow over the airfoil. Each of the heater elements is assigned to a single power phase and arranged such that an arbitrary section may be deactivated without causing a phase imbalance of more than one heating unit and such that a single zone may be activated without causing a phase imbalance of more than one heating unit.

7 Claims, 5 Drawing Sheets

WING ICE PROTECTION HEATER ELEMENT NETWORK

CROSS-REFERENCES TO RELATED APPLICATION

This application claims the benefit of U.S. Provisional Patent Application Ser. No. 60/866,022, filed on Nov. 15, 2006, the contents of which are hereby incorporated by reference in their entirety.

BACKGROUND OF THE INVENTION

The present invention relates to ice protection networks of heater elements used in anti-ice and de-ice systems for prevention and removal of ice from aircraft airfoils, and more particularly, for the balancing of electrical loads between the heater elements comprising the overall deicing system to accommodate malfunctions and selective heater element activation.

One of the problems encountered in modern day aviation is that of wing icing, where ice forms over the leading edges of the wings and control surfaces of an aircraft. Several methods have been devised to deal with this problem. One way is through the use of deicer boots installed along the leading edge of the airfoil. Deicer boots are typically constructed of neoprene and operate by causing it to change profile and break off the ice. Some use rotary devices that rotate within and against the internal surface of the deicer boot and some operate by expansion and relaxation of the deicer boot through use of compressed air. Either method will cause the deicer boot to expand beyond the standard airfoil profile and thus mechanically break the ice away from the leading edge of the airfoil. However, in order to break ice by using this device and method, it is first necessary to allow the ice to build up, or accrete, to the point where it will break away from the surface of the deicer boot without adhering thereto. Also, under extreme conditions, the ice may build up so fast around the boot between cycles that a cavity may be formed, in which the inner surface of the built-up ice in the cavity is just beyond the greatest extent of the deicer boot travel. In such conditions, ice may continue to build up while the deicer boot is rendered ineffective, since it only expands within the ice cavity and therefore has no effect on the built up ice.

Other de-icing methods apply engine bleed air directly onto the airfoil. High temperature and high pressure air is bled from the compression stages of an engine through pressure regulator valves and ducted through perforations on manifolds behind the leading edge inside the wing. The heat from this bleed air is sufficient to warm the wing to the point that it melts the ice interface, which causes the ice build-up to slide off the wing. However, a major disadvantage of this approach is that it reduces the efficiency of the engine, uses more fuel, and requires more complex designs to provide effective ducting.

Other anti-ice and de-icing designs in the prior art operate through electrical means. According to such designs, a heating blanket 115 is wrapped along the leading edge of an airfoil, typically the wing as depicted in FIG. 1, in order to provide resistive heating that melts ice as it forms along the airfoil. The heating blanket 115 may extend longitudinally along the leading edge 110 of the wing from the fuselage to the wing tip and horizontally along the upper and lower wing surfaces 130, 140 from the leading edge 110 a short distance towards the trailing edge 120 of the wing. The heater elements comprising the heating blanket 115 may be longitudinally divided into a plurality of sections from the innermost end of the heating blanket 115 in the proximity of the fuselage to the outermost end of the heating blanket 115 towards the wing tip. Each section is comprised of heater elements divided horizontally into zones (e.g. upper zone 150$a$-$c$, leading zone 160$a$-$c$, and lower zone 170$a$-$c$), so that each section will contain three separate zones. For example, zones 150$b$, 160$b$, and 170$b$ comprise a section. This division scheme forms a network of heater elements called a wing ice prevention (WIP) heating network.

The heater elements may, in some cases, be formed as individual, electrically heated mats, or heater elements, adhered to the aircraft surface by an adhesive. U.S. Pat. No. 5,765,779, issued to Hancock et al., discloses a mat section that is configured in groups to a structural member of an aircraft, such as an airfoil. Each mat is resistively heated by an electrical power source and may be operated independently of other such mats. The disclosure states that the mats may be grouped for connection to respective phases of a multi-phase alternating current (AC) power supply. The disclosure shows a mat adhered to the surface of a wing.

Each heater element may also be provided with an ice detection mechanism for determining the amount and extent of ice that may be forming or formed in the section and zone that the heater element services. The prior art is replete with various devices used for the detection of ice. One such example is given by U.S. Pat. No. 4,514,619, issued to Kugelman, which discloses an electrical device for monitoring the current flow through the resistive elements contained in the mat comprising the heater element, so that individual mats may be activated or deactivated, i.e. turned on or turned off, whenever the circuit detects conditions conducive to ice formation or error conditions.

Each heater element may be configured to have the different heating capacity as determined by the location of the portion of the heating blanket 115, i.e. the heater element, along the wing and the collection efficiency at that location. The heat generated by the resistive heater element may prevent or remove ice formation in these sections.

The resistive heater elements are generally powered by an electrical power control unit (EPCU) of the aircraft, which supplies 3-phase power to the heating network. The EPCU may distribute single-phase power to individual heater elements as required for ice-protection operations.

Error or failure conditions present special problems for WIP networks. During standard operation, an individual heater element may fail through damage from foreign objects impacting the wing, material fatigue, or other causes. When one heater element fails, then all heaters in the section containing the failed heater element must be turned off and the corresponding section in the other wing must also be turned off for aerodynamic considerations. For example, if the upper heater element in a section fails through an open-circuit, then all power to heater elements in that section on both wings will be removed from the upper, leading edge, and lower zones. To maintain reasonable power quality specifications under failure conditions, it is desirable to limit phase imbalance to a maximum threshold value. In case of failure of the ice detection mechanism, which may require a manual activation of the WIP, it is desirable to have the ability to activate the lower zone heater elements first to remove the accreted ice on the lower surface. This may allow a portion of the ice to be removed from the lower surface before activating the remaining zones to remove ice from the leading edge and upper surface, and thus reduce the probability of large ice chunks from damaging the aircraft as they break away from the airfoil. Thus it is desirable to maintain a reasonable balance in load between the three phases of the power source while at the same time providing the capability to activate the lower zone separately when a malfunction occurs in the ice detection circuitry. The network shown in FIGS. 2 and 3 and the network shown in FIGS. 4 and 5 show two network arrangements currently in use to resolve these problems. The sections have been numbered from 1 to 10 for illustrative purposes.

For the WIP heating network shown in FIGS. 2 and 3, Phase A is configured to supply electrical power to 3 sections (i.e. sections 3, 9, and 10, containing a total of 9 elements), Phase B is configured to supply power to 4 sections (i.e. sections 2, 7, and 8 containing a total of 9 elements), and Phase C is configured to supply power to 4 sections (i.e. sections 1, 4, 5, and 6, containing a total of 12 elements.) Although the number of heater elements is different for each phase, the phase balance between Phases A, B, and C is maintained by having substantially equal total resistance in the heater elements in each of the three phases. For the WIP heating network shown in FIGS. 4 and 5, the power distribution is configured so that Phase A supplies power to upper zone, Phase B supplies power to the leading edge zone, and Phase C supplies power to the lower zone. In normal operation all three phases are balanced equally with 10 heater elements each.

If there is an open circuit in a heater element and it fails, then all heater elements in the corresponding sections on both wings must be turned off for aerodynamic considerations. Referring to FIGS. 2 and 3, the WIP heating network shown will experience a phase imbalance when all three heater elements in the section containing the failed heater element must be deactivated, since each section is powered by a single phase, which would have a high probability of exceeding the maximum allowable threshold for phase imbalance. However, the WIP Heating network shown in FIGS. 4 and 5 may remain phase balanced when all heater elements in a section containing a failed heater element must be shut down, since each section is provided power by all three phases. A maximum threshold may be established such that the difference between power drawn in any two Phases should be less than about 3.3% of the total load under normal operation for loads above 30 kVA, according to MIL-STD-704F.

Note that the WIP Heating network in FIGS. 2 and 3 allows for the switching off of separate zones across all sections in the event of an ice detection failure since each zone is phase balanced. So this network would remain phase balanced for the activation of a single zone. However, the WIP Heating Network of FIGS. 4 and 5 shows that all power to the upper zone is supplied by Phase A, all power to the leading edge zone is supplied by Phase B, and all power to the lower zone is supplied by Phase C. If only a single zone were activated, e.g. the lower zone powered by Phase C, then a severe load imbalance would result, which would in all probability exceed the maximum threshold value. It is desirable to establish a maximum threshold value such that the difference between power drawn in any two Phases should be less than about 1/N of the total load, where N is the number of sections in the WIP. Thus, for the case where there are 10 sections, this means that a maximum threshold value should be about 10%.

Hence, it can be seen that there is a need for a system and method of distributing three phase AC power to the elements of a WIP heating network in such a way that the load on each of the phases is balanced according to the acceptable tolerance value in the event of a heater element failure, yet the load on each of the phases remains balanced if only a single zone must switched on or off as a unit in the event of an ice detection circuit failure.

SUMMARY OF THE INVENTION

In one aspect of the present invention, an ice protection network for a surface of an airfoil is provided. The network may comprise a plurality of heater elements providing resistive heating to a portion of the surface, the portion partitioned into one or more adjacent, non-overlapping sections spaced along the airfoil, with each section further partitioned into a plurality of adjacent, non-overlapping zones; and a multiphase power source having a plurality of power phases, each heater element receiving power from no more than one power phase. Each selected heater element is powered by a power phase that is different from the power phase that powers each adjacent heater element within the same section as the selected heater element, where the power phases powering the adjacent heater elements within the same section are different from each other. Furthermore, the selected heater element is powered by a power phase that is different from the power phase of each adjacent element within the same zone as the selected heater element, where the power phases powering the adjacent heater elements within the same zone are different from each other.

In another aspect of the invention, and by way of example only, a heating arrangement method is provided for a plurality of heater elements, where the heater elements are arranged in a grid along the surface of an airfoil with an airflow flowing across the airfoil, the grid having zones of heater elements extending along the surface perpendicular to the airflow, the grid further having sections of heater elements extending along the surface parallel to the airflow, the plurality of heater elements powered by a multiphase power source with three phases of power. The method comprises the steps of assigning each heater element, for any three consecutive heater elements within a zone, to a different power phase of the three phase power, for all zones in the grid; and assigning each heater element, for any three consecutive heater elements within a section, to a different power phase of the three phase power, for all sections in the grid.

In still another aspect of the invention, and by way of example only, a deicer is provided for a surface of a wing of an aircraft, the deicer comprising the following elements: a multiphase power source having three phases; a plurality of heater elements providing resistive heating to a portion of the surface, the portion partitioned into one or more adjacent, non-overlapping sections spaced along the airfoil, each section further partitioned into a plurality of adjacent, non-overlapping zones; and a multiphase power source having a plurality of power phases, each heater element receiving power from no more than one power phase. The deicer is arranged such that a selected heater element is powered by a power phase that is different from the power phase that powers each adjacent heater element within the same section as the selected heater element, the power phases powering the adjacent heater elements within the same section being different from each other, and the selected heater element is powered by a power phase that is different from the power phase each adjacent element within the same zone as the selected heater element, the power phases powering the adjacent heater elements within the same zone being different from each other.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the invention provides an arrangement of heater elements, each of which is powered by a single phase of a multiphase power source that can be separately activated and deactivated without causing a phase imbalance that exceeds a given threshold. In this manner, failures in individual heater elements may be accommodated and individual heater elements may be activated and deactivated, manually or automatically, while maintaining balance of power between the power phases. Adjacent heater elements may be staggered between different power phases according to a combination of pre-defined arrangements so that loads are maintained within the threshold value. This invention may be used in the aviation industry for arranging mats along the leading edges of airfoils found on airplane lifting surfaces such as wings, rear stabilizers, and elevators. The invention may also be used on aerodynamic devices such as propellers, engine cowl and the blades of wind powered generators.

In applications where three-phase electrical power is used for ice-protection, this arrangement of staggered heater elements may either eliminate or mitigate the phase imbalance that results when one or more heater elements are not operational. The resulting phase imbalance may be either eliminated in some cases or kept less than a known maximum, so that systems can be designed for the known maximum imbalance value. In the case of heater elements aligned along the leading edge zone, upper surface zone, and lower surface zone of an airfoil, the prior art has either assigned all the heater elements in a zone, i.e. leading edge, upper, or lower, to the same phase or else has assigned all the heater elements in each section to one of the three phases. The arrangement in the former case prevents an entire zone from being turned on since this would result in two unused phases and a drastic imbalance in load. The arrangement in the latter case causes a large imbalance when an individual heater element fails, necessitating an operational procedure of turning off all heater elements in the failed heater element's section plus the corresponding section on the opposite wing. The invention presents a staggered arrangement in which heater elements are assigned in such a way that both of these situations may be accommodated without an imbalance of more than one heater element load. The result is better operational performance of deicer systems that use a heater element mat arrangement.

Figure 6:
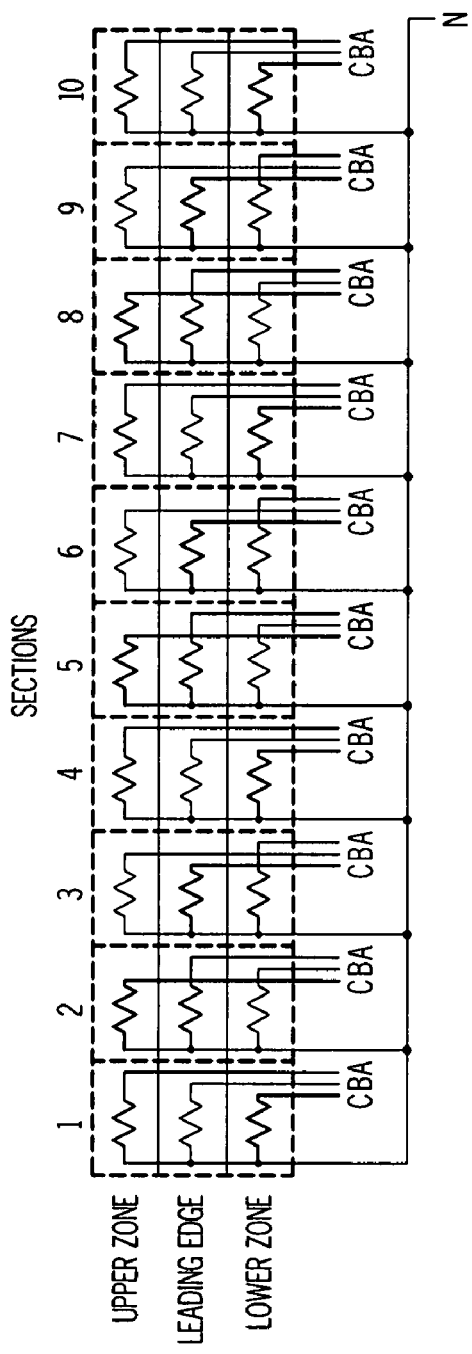
FIG. 6 is a schematic diagram of the WIP heating network powering arrangement, according to an embodiment of the present invention.

Referring now to FIG. 6, a power arrangement is shown in which each heater element may be powered by a single phase of a three phase power supply. If the phases are designated as Phase A, Phase B, and Phase, C, it may be seen that each heater element, shown schematically as a resistance, may have a power phase applied to a first end of the resistance, with all second ends connected to neutral, or ground, as designated in the figure as N. The sections have been arbitrarily numbered from 1 to 10 for ease of reference, as shown in FIG. 6, but choice of 10 sections is arbitrary and should be taken as an illustrative example only; more or less sections may be included within the scope of the invention without limitation. Each of the heater elements may be turned on or off, i.e. made operational or non-operational, under command of an element control system (not shown). A heater element may be non-operational either by an affirmative command from the control system or through equipment failure. In the event of equipment failure, the control system may also include failure detection circuits that allow the control system to detect a failure event for each heater element and to command other heater elements in the failed heater element's section to turn off. In addition, the control system may be able to turn all heater elements in a zone either on or off as a collection. Such control systems and failure detection circuits are well known in the prior art.

Figure 1:
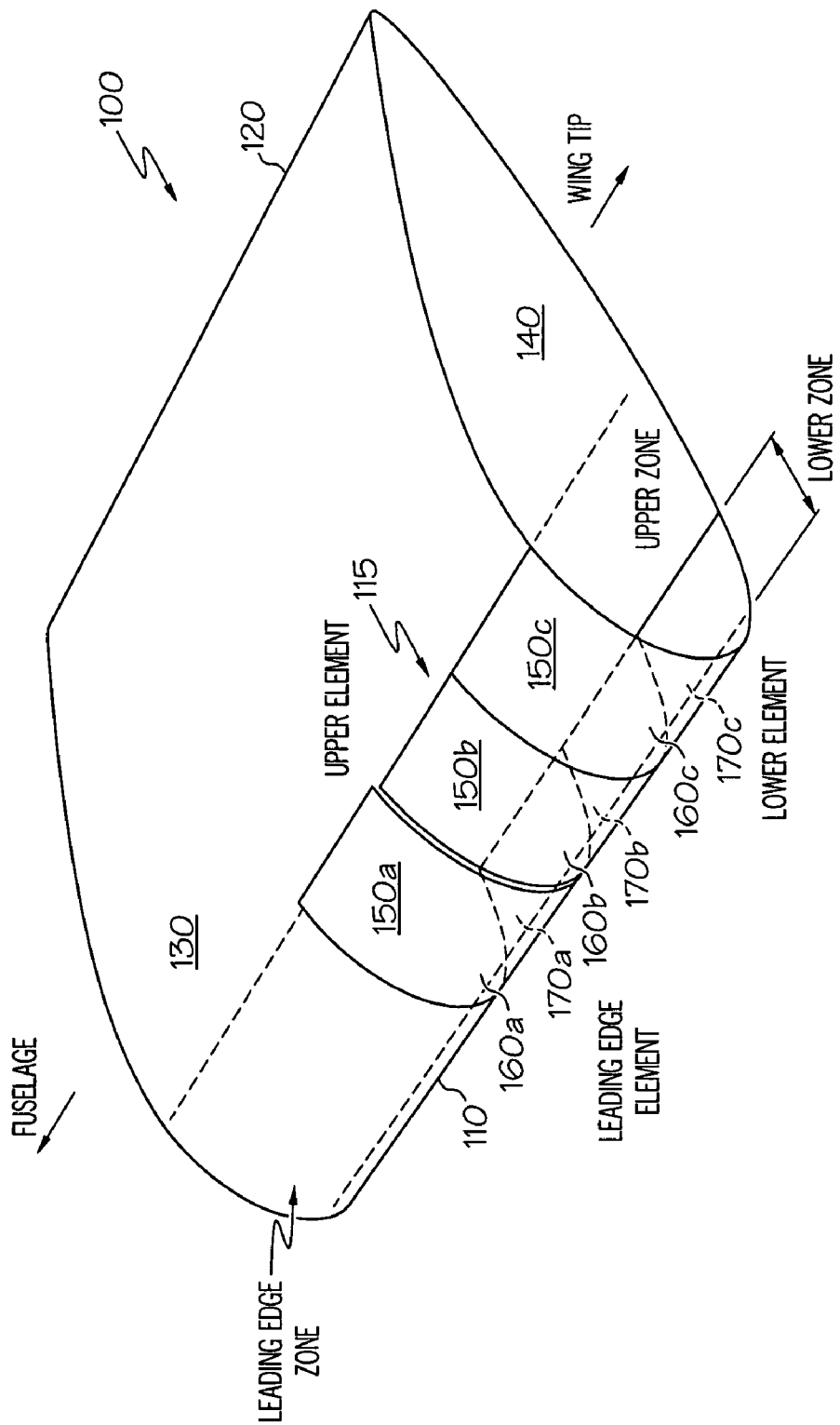
FIG. 1 is a perspective diagram of the configuration of sections along an airfoil and of zones within each section, according to the prior art.
Figure 2:
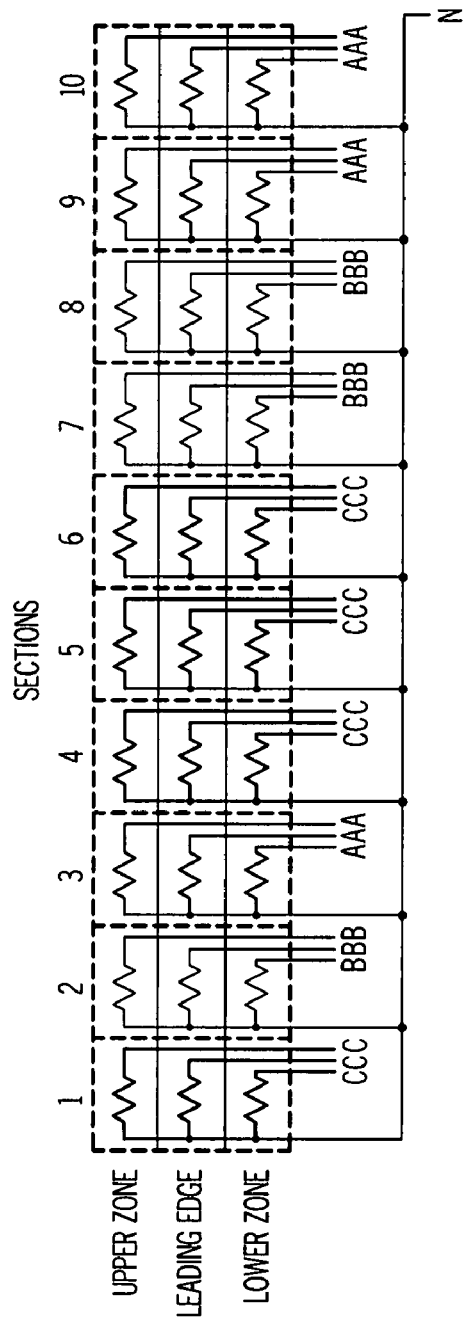
FIG. 2 is a first schematic diagram of a prior art embodiment of a power arrangement for a WIP, in which entire sections are supplied power from the same phase of three-phase power, according to the prior art.
Figure 3:
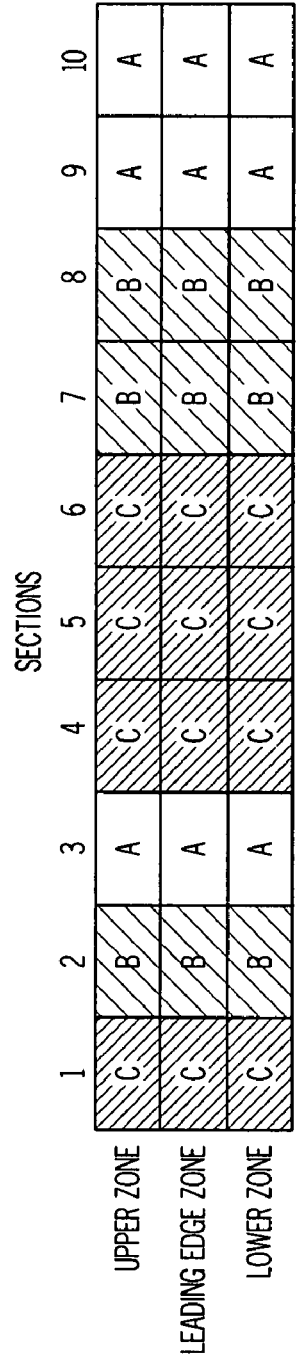
FIG. 3 is a logical map of the heating areas of an airfoil powered according to the first schematic diagram, in which entire sections are supplied power from the same phase of three-phase power, according to the prior art.
Figure 4:
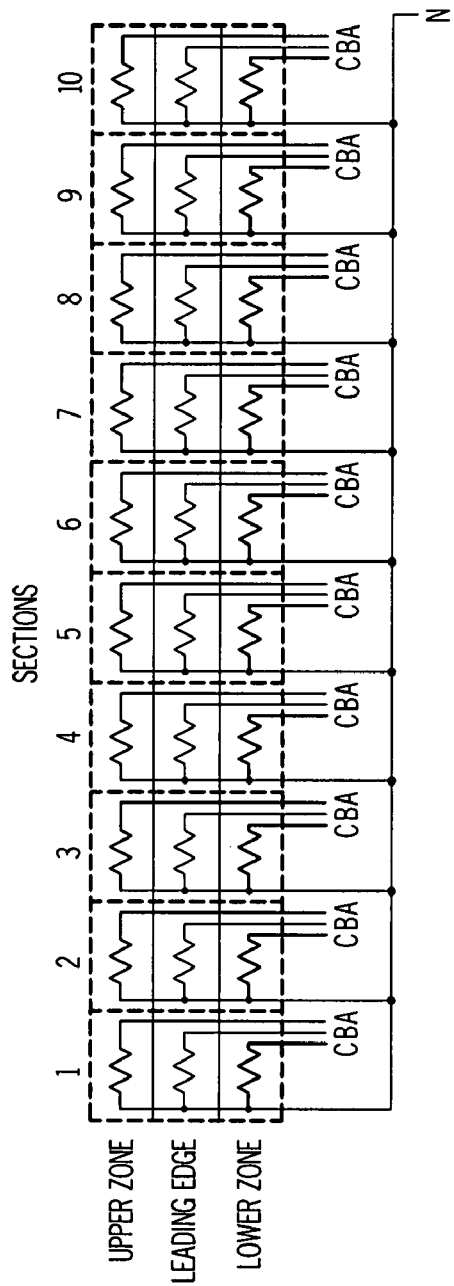
FIG. 4 is a second schematic diagram of a prior art embodiment of a power arrangement for a WIP, in which one phase of three phase power supplies all power to all zones of the same type, according to the prior art.
Figure 5:
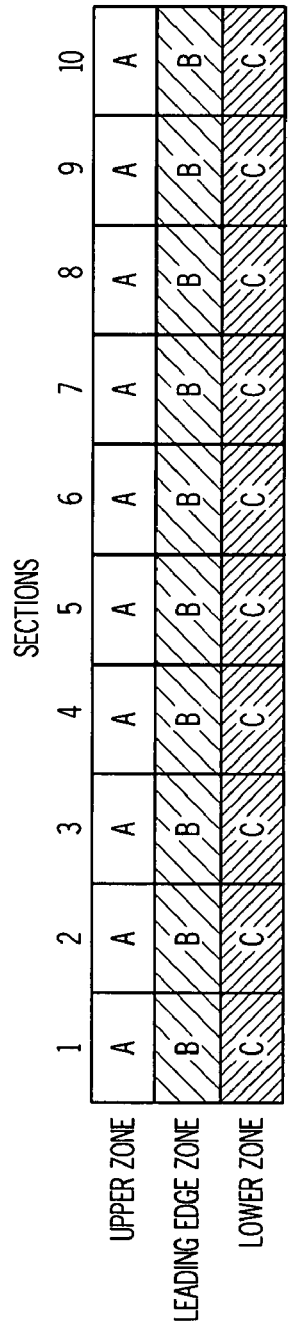
FIG. 5 is a logical map of the heating areas of an airfoil powered according to the second schematic diagram, in which one phase of three phase power supplies all power to all zones of the same type, according to the prior art.
Figure 7:
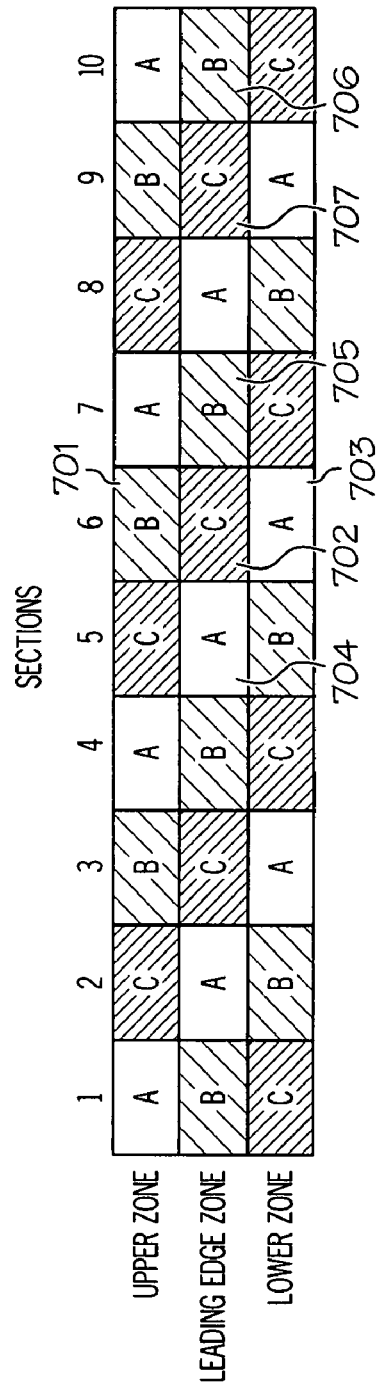
FIG. 7 is a logical map of the heating areas of an airfoil configured according to an embodiment of the invention.

FIG. 7 shows the arrangement of heater elements with the power phase encoded as a pattern, according to an embodiment of the invention. It should be noted that this figure may show the logical electrical arrangement of the heater elements and not necessarily the physical shapes of the individual heater elements. For example, although the heater elements may be shown to be rectangles (FIG. 1) they may not necessarily have that shape. Any simple polygon may be used without departing from the scope of the invention. For example, individual heater elements shapes may be triangular or hexagonal. They may mesh together to form both an electrical network (logical) and a physical network that provides surface coverage and the desirable heating effect. For purposes of this discussion, logical adjacency for two heater elements may be defined as two elements within either the same zone or the same section, but not both, where there is no intervening heater element between the two heater elements. In this embodiment, three phase power may be used, with each heating mat assigned to one of the three phases. Thus, by way of example, heater element 702 is shown assigned to Phase C. According to the inventive arrangement, one condition of the arrangement may be that the heater elements 704, 705 adjacent to heater element 702 within a zone may be assigned to phases other than that of heater element 702, i.e. phases A and B, respectively. Another condition of the arrangement may be that heater elements 701, 703 adjacent to heater element 702 within the same section may be assigned to phases other than that of heater element 702, i.e. phases B and A, respectively. Finally, another condition of the arrangement may be that the phases of the heater elements adjacent to heater element 702 within the same section, i.e. 701, 703, and the heater elements adjacent to heater element 702 within the same zone, i.e. heater elements 704, 705, may each be assigned to different phases as well, i.e. phases B/A and phases A/B, respectively.

Note that, there may be certain boundary conditions for this arrangement. If we consider heater element 701, which may have only one adjacent heater element 702 in its section, then heater element 702 may be assigned either to Phase C or to Phase A, as long as the other conditions are met. Similarly, if we consider heater element 706; which may have only one adjacent heater element 707 in its zone, then heater element 706 may have only one adjacent heater element 707 in its zone; if heater element 706 is assigned to Phase B, then heater element 707 may be assigned to either Phase A or Phase C, as long as the other conditions are met.

During severe weather conditions during which icing occurs, when one heater element fails, then all heaters in the corresponding section on both wings must be turned off for aerodynamic considerations. For this embodiment, it may be seen that if a heater element 701 fails, then the remaining heater elements in that section, i.e. 702 and 703, may be turned off. The remaining heater elements are assigned as follows: nine heater elements on Phase A, nine heater elements on Phase B, and nine heater elements on Phase C. There is no net imbalance in heater elements.

In addition, during operation, it may be desired to activate all heater elements of the lower zone only. This means that, according to the example shown in FIG. 7, three heater elements on Phase A, three heater elements on Phase B, and four heater elements on Phase C, for a net imbalance again of one heater element on Phase C. In other words, it can be readily seen that if any combination of zones is turned off, then the phase imbalance between the three phases that may result will not exceed one element, the amount of phase power imbalance that a single heater element draws. Note that the net imbalance in heater elements will be zero if the number of sections is selected such that it is a multiple of three.

Figure 8:
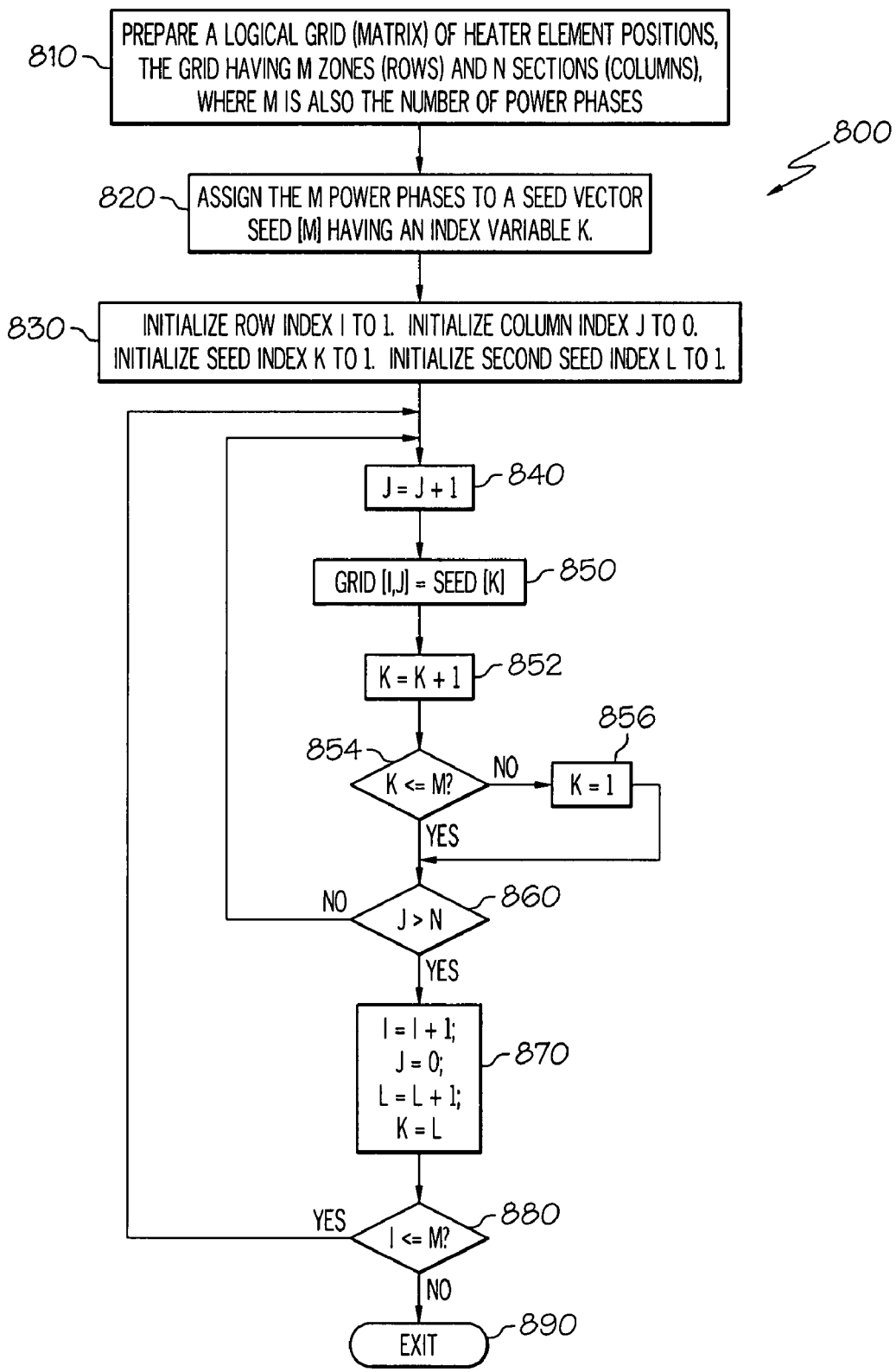
FIG. 8 is a flowchart depicting a method of arranging sections and zones along a surface of an airfoil that ensures that electrical load is balanced across all power phases, according to an embodiment of the invention.

Referring now to FIG. 8, a flowchart illustrates a method 800 for staggering the heater elements according an embodiment of the invention. A logical grid of heater elements may be prepared for the airfoil according to the block designated as 810. Three zones may be laid out across the surface of the airfoil, where one zone covers the leading edge of the airfoil (leading zone), one zone abuts the leading zone along a surface of the airfoil (upper zone), and one zone abuts the leading zone along an opposing surface of the airfoil (lower zone). A heater element may later be physically installed at each position in the grid. Since the discussion that follows will be mathematical in nature, it may be more convenient notationally to refer to the grid as an M×N matrix GRID, the zones as a sequence of M numbered rows, and the sections as a sequence of N numbered columns. The number of rows M may be the same as the number of AC power phases for convenience of discussion.

If there are M power phases, then there may be M! permutations of the M power phases for assignment to the grid. Accordingly, one of these M! permutations may be arbitrarily selected and assigned to a seed vector, or array, SEED having dimension M×1, according to the block designated as 820. This may allow the phases to be iteratively assigned to a grid zone section by section.

Next, the method for assigning phases to the grid may require an initialization step from which the method starts, according to the block designated as 830. In order to iteratively assign phases to the array GRID, a counter I for the rows (zones) may be initialized to 1, a counter J for the columns (sections) may be initialized to 0, and a counter K for the seed vector SEED may be initialized to 1. Additionally a second counter L for seed vector SEED may also be initialized to 1 so that each time an assignment operation for a new row (zone) is begun, the assignment may be initiated to start with the next sequential phase of the permutation in seed vector SEED and continue in a round robin fashion until the last row entry has been assigned.

An outer loop may be entered by incrementing the counter J by 1, according to the block designated as 840. Note that this is also an entry point for an inner loop as will be seen presently. The "next" phase of the chosen permutation in the SEED vector may be assigned to the GRID entry designated by the current values of I and J, according to the block designated as 850. Note that for the first iteration, GRID[1, 1]=SEED[1]. The index K may then be incremented by 1 to get the next phase of the SEED vector, according to the block designated as 852. If the index K exceeds the dimensions of vector SEED, i.e. if K>M, (block 854), then the index M may be reset to 1, according to the block designated as 856. A check may then be made to see if all columns (sections) for a row (zone) have been examined; if J<=N, according to the block designated as 860, then not all sections within the current zone (row) have been assigned and an inner loop designated by blocks 840, 850, 852, 854, and 856 may be iteratively repeated for the next column (section) within the current row (zone).

If all sections within a row (zone) have been sequentially assigned to the phases given in the array SEED, then the inner loop may be exited to the outer loop. According to the block designated as 870 in the outer loop, the next row (zone) may be indexed by incrementing index I by 1. Similarly, the next starting phase may be indexed by incrementing index L by 1. The column counter J may be reinitialized to 0 and the SEED array counter K may be reinitialized to L. A check may then be made to see if the row (zone) indexed by I is valid; if I<=M, then the outer loop may be iteratively repeated beginning with the block designated as 840. Otherwise, the outer loop may terminate according to the block designated as 890.

Although the nature of the iterative loops has been explained according to one embodiment, it should be obvious to those skilled in computer science principles that other forms of iterative procedures may be used without departing from the scope of the invention, i.e. the so-called FOR, UNTIL, WHILE, and REPEAT forms of iterative methods with the appropriate initializations and counters. Furthermore, the choice of whether to iteratively proceed along a zone while checking each section or to iteratively proceed along a section while checking each zone may also be arbitrary.

Thus, it may be seen that for a grid-based heating network WIP system, using three-phase power, under partial power operation, the method described herein may remain phase balanced within a tolerance of a single heater element whenever an entire section must be deactivated or when only a single zone may be activated. The method may be logically extended to higher phase power arrangements, although such higher phase power arrangements are not being used at the current time.

It should be understood, of course, that the foregoing relates to exemplary embodiments of the invention and that modifications may be made without departing from the spirit and scope of the invention as set forth in the following claims.

We claim:

1. A heating arrangement method for a plurality of heater elements, the heater elements arranged in a grid along the surface of an airfoil with an airflow flowing across the airfoil, the grid having zones of heater elements extending along the surface perpendicular to the airflow, the grid further having sections of heater elements extending along the surface parallel to the airflow, the plurality of heater elements powered by a multiphase power source with three phases of power, the method comprising for any three consecutive heater elements within a zone, assigning each heater element to a different power phase of the three phase power, for all zones in the grid; and for any three consecutive heater elements within a section, assigning each heater element to a different power phase of the three phase power, for all sections in the grid.

2. The heating arrangement method of claim 1, wherein the grid has three zones.

3. The heating arrangement method of claim 2, wherein the number of heater elements assigned to a first selected phase does not differ from the number of heater elements assigned to a second selected phase by more than one.

4. The heating arrangement method of claim 1, wherein every heater element has the same electrical load value.

5. The heating arrangement method of claim 1, wherein the total load of the heating elements in each zone is electrically identical.

6. The heating arrangement method of claim 1, wherein the number of heater elements powered by a first selected phase does not differ from the number of heater elements powered by a second selected phase by more than one whenever power is removed from all heater elements of a selected section.

7. The heating arrangement method of claim 1, wherein the number of heater elements powered by a first selected phase does not differ from the number of heater elements powered by a second selected phase by more than one whenever power is applied to all heater elements of a selected zone.

* * * * *